3,185,678
POLYMETHYLENIMINOALKYLAMIDES
Leo G. Abood, Oak Park, Ill., assignor to Colgate-Palmolive Company, a corporation of Delaware
No Drawing. Filed Aug. 4, 1961, Ser. No. 129,245
7 Claims. (Cl. 260—239)

This invention relates to chemical compounds, pharmaceutical unit dosage forms containing the same, and methods of treating animals and humans with the compounds.

This application is a continuation-in-part of copending applications Serial No. 48,860, filed August 11, 1960, and Serial No. 71,454, filed November 25, 1960, both now abandoned.

According to the present invention it has been discovered that polymethyleniminoalkylamides of the formula

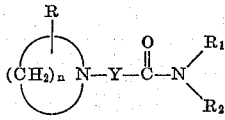

wherein $n$ is an integer from 4 to 7, Y is a straight or branched lower alkylene and particularly such groups having 1 to 4 carbons, R represents hydrogen, 1 to 6 and advisably 1 to 4 nuclear methyl groups, a hydroxy group, and the hydroxy group on the ring with 1 to 4 methyls also on the ring such as on 4-hydroxy-2,4-dimethyl piperidine, and $R_1$ and $R_2$ are the same or different members of the group consisting of hydrogen and lower alkyls such as methyl, ethyl, propyl and isopropyl are especially potent tranquilizing agents and skeletal muscle relaxants.

The polymethyleniminoalkylamides can be produced by condensing the appropriate polymethylenimino base with a reactive haloalkylamide in a suitable inert liquid reaction medium such as benzene, toluene, xylene, tetrahydrofuran, dioxane or diglyme, in the presence of an acid acceptor such as excess piperidine base, sodium bicarbonate, sodium carbonate, antipyrine, potassium hydroxide, sodium hydroxide, calcium hydride, calcium oxide or calcium hydroxide. The reaction proceeds at moderately increased temperatures although the reflux temperature is preferred. After the reaction is terminated, the insoluble organic or inorganic salts can usually be removed by filtration and the desired polymethyleniminoalkylamide recovered by partial or total removal of solvent.

Some of the polymethylenimines which can be used in the process are piperidine, 2-methylpiperidine, 3-methylpiperidine, 4-methylpiperidine, 2,2-dimethylpiperidine, 2,3-dimethylpiperidine, 2,4-dimethylpiperidine, 2,6-dimethylpiperidine, 2,2,6-trimethylpiperidine, 2,2,6,6-tetramethylpiperidine, 2,2,4,6,6-pentamethylpiperidine, 3-hyhydroxypiperidine, 4-hydroxypiperidine, pyrrolidine, 2-methylpyrrolidine, 3-hydroxypyrrolidine, 2,4-dimethylpyrrolidine, hexamethylenimine, (also called hexahydroazepine), 2,4-dimethyl hexamethylenimine, heptamethylenimine and 2,2-dimethyl heptamethylenimine.

Representative of the reactive haloalkylamides which can be used in the process are chloroacetamide, N,N-dimethyl chloroacetamide, N,N-diethyl bromoacetamide, N-methyl chloroacetamide, N-ethyl chloroacetamide, N,N-diethyl chloroacetamide, chloropropionamide, N-methyl chloropropionamide, N,N-dimethyl chlorobutyramide, chlorobutyramide, bromovaleramide, N-propyl chlorovaleramide, N,N-dimethyl bromovaleramide, N,N-dipropyl chloropropionamide and N-methyl-N-ethyl chloropropionamide.

Some of the compounds which are produced as described are:

Pyrrolidinoacetamide,
3-hydroxypyrrolidinoacetamide,
2-methylpyrrolidinoacetamide,
Pyrrolidinopropionamide,
Pyrrolidinobutyramide,
Piperidinoacetamide,
3-(piperidino)-propionamide,
4-(piperidino)-butyramide,
5-(piperidino)-valeramide,
Hexamethyleniminoacetamide,
3-(hexamethylenimino)-propionamide,
4-(hexamethylenimino)-butyramide,
5-(hexamethylenimino)-valeramide,
Heptamethyleniminoacetamide,
3-(heptamethylenimino)-propionamide,
3-hydroxypiperidinoacetamide,
3-(4-hydroxypiperidino)-propionamide,
2,2-dimethyl-4-hydroxy piperidinoacetamide, and secondary and tertiary amides of such compounds containing N-methyl, N-ethyl, N-propyl, N-isopropyl, N,N-dimethyl, N,N-diethyl and N,N-dipropyl groups.

It is believed that the compounds herein described are new with the exception of piperidinoacetamide.

The described compounds can be administered as the basic amides, in the form of nontoxic pharmacologically acceptable acid addition salts such as the hydrochloride, sulfate, phosphate, maleate, tartrate and succinate, or complexed with aromatic carboxylic acids containing an ortho phenolic hydroxy group such as salicyclic acid.

These and other compounds within the concept of this invention reduce body tension and spontaneous activity. They produce a calming effect and also block the hyneractivity produced by such psychotomimetic agents as N-methyl-3-piperidyl benzilate HCl.

The piperidinoacetamides of the formula

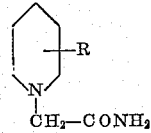

wherein R represents hydrogen or 1 to 6, and advisably 1 to 4, nuclear methyl substituents, in the two to six positions, as well apparently as the other described compounds, have a primary tranquilizing and muscle relaxant effect but, in addition, they are mildly stimulatory in withdrawn patients. Thus, the compounds can be referred to as normalizing agents with primary tranquilizing action. This type of effect has not been seen with any of the tranquilizers now marketed which produce a profound sedation which incapacitates the ambulatory patient so that in many instances he cannot pursue his normal occupation. The dual effect of tranquilization and mild stimulation is thus highly desirable and is of special importance in anxiety depressions. Increased methylation of the piperidine ring increases the stimulatory effect.

Presently considered the preferred compound of the group is piperidinoacetamide. This compound has an $LD_{50}$ of 275 mg./kg. I.P. in mice and of 250 mg./kg. I.P. in rats. At doses of 50–150 mg./kg. I.P. in rats this compound produces marked muscle relaxation, reduction of body tension, and cessation of spontaneous activity.

There is a considerable decrease in response to external stimuli (i.e., decreased hypersensitivity), very slight analgesia, ptosis, with no apparent autonomic signs. The duration of the tranquilization or calming effect in rats is from one to two hours, after which time the animals seem a little more active.

As determined by experimentation in rats in a hyperactivity cage, piperidinoacetamide will almost completely block the hyperactivity produced by N-methyl-3-piperidyl benzilate HCl. In this test 100 mg./kg. of piperidinoacetamide is administered to a rat followed five minutes later by 5 mg./kg. of N-methyl-3-piperidyl benzilate HCl. An average activity of 300 oscillations per minute results as compared to 1500 when only N-methyl-3-piperidyl benzilate HCl is administered. This is about an 80% block. Since the hyperactivity effect of N-methyl-3-piperidyl benzilate HCl is related to the psychotomimetic action of this compound, the results can be interpreted to mean that piperidinoacetamide is antagonistic to the central actions of a psychotomimetic agent. Other central effects of N-methyl-3-piperidyl benzilate HCl such as increased body tension, hypersensitivity and aggressiveness are also blocked by piperidinoacetamide.

Schizophrenic patients, some of whom were paranoid schizophrenics, to whom two capsules containing 250 mg. of piperidinoacetamide were given three times daily, experienced a tranquilizing or calming effect after a few days therapy. There was a reduction of hallucinations, combativeness and irritability. The patients said they felt better, ate better and slept better. Two of the patients who were catatonic seemed somewhat more talkative, more rational and less withdrawn after one week on the drug. Although the drug had primarily a tranquilizing and muscle relaxant effect, it also had a mild stimulating effect on withdrawn patients.

It has been found that the complex alpha-(piperidino)-acetamide salicylate gives a greater analgesia than the piperidinoacetamide base or acid addition salts thereof. Alpha-(piperidino)acetamide salicylate, however, can also be used for skeletal muscle relaxation, reduction of body tension and to obtain decreased response toward external stimuli. It could also exert an antipyretic action and to produce a calming or tranquilizing effect while abolishing skeletal muscle pain and headache. The salicylate salts of the other described bases may be expected to respond similarly.

The polymethyleniminoalkylamides may be administered, as the basic amides, as nontoxic acid salts, such as the hydrochloride, sulfate, phosphate, maleate, tartrate and succinate, or as a complex with an aromatic carboxylic acid containing an ortho phenolic hydroxy group such as salicyclic acid, to animals and humans as pure compounds. It is advisable, however, to first combine one or more of the compounds with a suitable pharmaceutical carrier to attain a more satisfactory size to dosage relationship.

Pharmaceutical carriers which are liquid or solid can be used. The preferred liquid carrier is water. Flavoring materials may be included in the solutions as desired.

Solid pharmaceutical carriers such as starch, sugar, talc and the like may be used to form powders. The powders may be used as such for direct administration to a patient, or, instead, the powders may be added to suitable foods and liquids, including water, to facilitate administration.

The powders also may be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets, capsules and suppositories may contain any suitably predetermined amount of one or more of the compounds such as the piperidinoacetamides, as the basic amide, in the form of a nontoxic acid addition salt, or complexes as described and may be administered one or more at a time at spaced intervals.

Such unit dosages can contain, illustratively, from about 15 to 500 mgm., and advisably 50 to 300 mgm., of an active compound. Variation in activity between compounds is to be expected. Such variations are to be taken into account in utilizing these compounds. Such determinations are readily made by those skilled in the art. Daily dosages of about 0.5 to 6.0 gm. are suitable, with the prescribed dosage being determined by a physician. The oral route of administration is preferred.

In the following table there is presented pharmacological data for some of the compounds which illustrates their muscle relaxant activity.

TABLE

| Compound | Prehensile Reflex (PD$_{50}$) Oral-Mice, mg./kg.[1] | Inclined Screen (ED$_{50}$) S.C. Mice, mg./kg.[2] | LD$_{50}$ Oral-Mice, mg./kg. |
|---|---|---|---|
| Pyrrolidinoacetamide | 259±90 | 266±29 | 1,895 43.7±2.4 (i.v. mice) |
| Piperidinoacetamide | 172±42 | 53±10 | 815±60.9 (oral rat) 48.6±4.3 (i.v. rat) |
| Piperidinopropionamide | 80±39.5 | 53.8±15.7 | 342±30.1 |
| Hexamethyleniminoacetamide | 54±37 | 71±9.5 | 447±55 |
| Heptamethyleniminoacetamide HCl | 289±79 | 166±20 | 836 |

[1] Untreated male mice (23-29 g.), having demonstrated their ability to cling to a taut string until a sixty second cutoff were given JB-900 (gamma-(3-methylpiperazino)-propyl benzilate) as an 0.25, 1.0, or 2.0% aqueous solution by stomach tube. Five mice received the drug at each of five dosage levels logarithmically spaced from 12.5 to 200 mg./kg. Their clinging ability was retested at various times thereafter, and the mean group hanging-time calculated. Muscle weakness reduced the group mean hanging-time as a function of JB-900 dosage. The end point was obtained by plotting log dose vs. maximum percent inhibition of control mean hanging-time.

[2] A modification of Thompson's inclined screen procedure (Endocrinology 39:62, 1946) was used wherein five groups of ten male mice (21-35 g.) were injected subcutaneously with JB-900 in a volume of 0.01 ml./gm. at logarithmically spaced concentrations varying from 0.05 to 1.0%. Immediately thereafter, the mice from each dosage group were placed upon 16″ x 35″ stalls of 16 mesh nylon screen inclined at 60°. Animals displaying skeletal muscle paralysis or weakness and abruptly sliding to the bottom of the screen within one-half hour were considered positive reactors. The ED$_{50}$ was estimated by the method of Miller and Tainter, Proc. Soc. Exper. Biol. and Med., 57:261, 1944.

The following examples are presented to illustrate the production of compounds of this invention.

*Example 1.—Piperidinoacetamide*

To a solution of 511 g. (6 moles) of piperidine and 1500 cc. of dry benzene at 70° C. was added, portionwise, 280.5 g. (3 moles) of chloracetamide. The mixture was stirred and refluxed for two hours. The solids were filtered off and the filtrate was concentrated to dryness. The combined solids were dissolved in 1000 cc. of water saturated with sodium bicarbonate. The aqueous solution was extracted with three 250 cc. portions of tetrahydrofuran. The combined extracts were washed with saturated salt solution, dried over sodium sulfate and concentrated to dryness. Wt. 338 g. (79.3%), M.P. 112–113° C.

*Analysis.*—Calcd. for $C_7H_{14}N_2O$: N, 9.85. Found: N, 9.69.

*Example 2.—Piperidinoacetamide salicylate*

To 138 g. (1.0 mole) of salicylic acid in 250 cc. of isopropyl alcohol (hot), there was added 142 g. (1.0 mole) of alpha-piperidinoacetamide dissolved in 250 cc. of hot isopropyl alcohol. The solution was cooled and ether added to turbidity. A solid soon crystallized, M.P. 92–94° C., yield 166 g. (59%).

*Analysis.*—Calcd. for $C_{14}H_{20}N_2O_4$: N, 5.00; N.E., 280.3. Found: N, 4.84; N.E. 270.4.

*Example 3.—Pyrrolidinoacetamide*

To a mixture of 18.7 g. (0.2 mole) of chloroacetamide and 250 cc. of dry toluene at 90° C. was added 28.5 g.

(0.4 mole) of pyrrolidine. The mixture was refluxed for two hours and the toluene solution was separated from an oily gum. The toluene solution was concentrated to dryness, and the residue weighed 17.2 g., M.P. 110–112° C. Solid was recrystallized in 500 cc. of boiling heptane. Wt. 13.7 g. (53.5%), M.P. 112–113° C.

*Analysis.*—Calcd. for $C_6H_{12}N_2O$: N, 10.92. Found: N, 10.97.

*Example 4.—Hexamethyleniminoacetamide*

To a mixture of 18.7 g. (0.2 mole) of chloroacetamide and 250 cc. of dry toluene at 90° C. was added 40 g. (0.4 mole) of hexamethylenimine. The mixture was refluxed for two hours, and the salt was filtered off. The filtrate was concentrated to dryness and the residue weighed 33.2 g., M.P. 88–91° C. The solid was recrystallized in 700 cc. boiling heptane. Wt. 26.1 g. (83.5%), M.P. 96–97° C.

*Analysis.*—Calcd. for $C_8H_{16}N_2O$: N, 8.96. Found: N, 8.93.

*Example 5.—3-hydroxypiperidinoacetamide fumarate*

To a mixture of 18.7 g. (0.2 mole) of chloroacetamide and 250 cc. of dry toluene at 90° C. was added 40.4 g. (0.4 mole) of 3-hydroxypiperidine. The mixture was refluxed for two hours. The toluene was decanted from the oil, evaporated to dryness. No residue was found. The oil was dissolved in 200 cc. of water, neutralized with sodium bicarbonate, extracted with tetrahydrofuran, dried over sodium sulfate, and concentrated to dryness. Residue—18.5 g.

The above base 18.5 g. (0.117 mole), 13.6 g. (0.117 mole) of fumaric acid and 100 cc. of ethanol was heated to effect solution. The gummy solid was suspended in acetonitrile, filtered, and dried. Wt. 19.3 g. (35.2%), M.P. 92–93° C.

*Analysis.*—Calcd. for $C_{11}H_{18}N_2O_6$: N, 5.10; N.E., 137.12. Found: N, 4.87; N.E., 146.0.

*Example 6.—Heptamethyleniminoacetamide*

To a mixture of 14 g. (0.15 mole) of chloroacetamide and 250 cc. of dry toluene at reflux was added 34 g. (0.3 mole) of heptamethylenimine. The mixture was refluxed for three hours and the toluene solution was separated from an oily gum. The toluene solution was concentrated to dryness and the residue was dissolved in 300 cc. of boiling heptane. The solid was filtered off, dried and weighed 11.2 g. (43.5%), M.P. 73–74° C.

*Analysis.*—Calcd. for $C_9H_{18}N_2O$: N, 8.23. Found: N, 7.79.

To a suspension of 10.8 g. (0.063 mole) of the base in 200 cc. of ether was added ethereal hydrochloric acid to pH-2. The solid was filtered off and recrystallized in 200 cc. of boiling acetonitrile. Wt. 10.2 g. (78.5%), M.P. 119–120° C.

*Analysis.*—Calcd. for $C_9H_{19}ClN_2O$: N, 6.77; Cl, 17.15. Found: N, 6.72; Cl, 17.46.

*Example 7.—4-(hexamethylenimino)butyramide dihydrochloride*

To a mixture of 35 g. (0.42 mole) of 4-chlorobutyramide and 420 cc. of dry toluene at 90° C. was added 92.5 g. (0.85 mole) of hexamethylenimine. The mixture was refluxed for five hours and the salt was filtered off. The filtrate was concentrated to dryness and the residue weighed 67 g. The base was dissolved in 500 cc. of anhydrous ether and acidified with ethereal hydrochloric acid. The solid was filtered off and recrystallized in 1750 cc. of boiling acetonitrile. Wt. 23 g. (31.6%), M.P. 128–130° C.

*Analysis.*—Calcd. for $C_{10}H_{22}Cl_2N_2O$: N, 10.87; Cl, 27.57. Found: N, 10.97; Cl, 27.84.

*Example 8.—3-(hexamethylenimino)propionamide hydrochloride*

A mixture consisting of 11.6 g. (0.076 mole) of beta-bromopropionamide, 100 cc. of dry toluene, and 16.5 g. (0.152 mole) of hexamethylenimine was refluxed for five hours. The salt was filtered off and the filtrate concentrated to dryness. The residue was recrystallized in n-hexane. Wt. 11 g. (85%), M.P. 50–52° C.

The base was dissolved in anhydrous ether and acidified with ethereal hydrochloric acid. The solid was filtered off and recrystallized in 500 cc. of boiling acetonitrile. Wt. 10.4 g. (66%), M.P. 193–194° C.

*Analysis.*—Calcd. for $C_9H_{19}ClN_2O$: N, 6.77; Cl, 17.10. Found: N, 6.68; Cl, 17.04.

Various changes and modifications of the invention can be made and, to the extent that such variations incorporate the spirit of this invention, they are intended to be included within the scope of the appended claims.

What is claimed is:

1. A compound of the formula

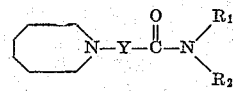

wherein $R_1$ and $R_2$ are hydrogen, and Y is lower alkylene.

2. A compound of the formula

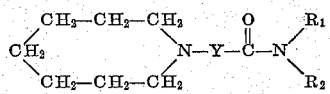

wherein $R_1$ and $R_2$ are hydrogen, and Y is lower alkylene.

3. Hexamethyleniminoacetamide.
4. Heptamethyleniminoacetamide.
5. 4-(hexamethylenimino)butyramide.
6. 3-(hexamethylenimino)propionamide.
7. A member of the group consisting of compounds of the formula

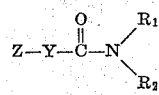

and nontoxic acid addition salts thereof, wherein Y is lower alkylene, $R_1$ and $R_2$ are hydrogen and Z is a member of the group consisting of

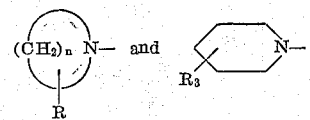

wherein $n$ is an integer from 6 to 7, R is a member of the group consisting of hydrogen, 1 to 6 methyl groups, hydroxy, and the hydroxy group on the ring with 1 to 4 methyl groups, and $R_3$ is a member of the group consisting of hydroxy, and the hydroxy group on the ring with 1 to 4 methyl groups.

References Cited by the Examiner

UNITED STATES PATENTS

| | | | |
|---|---|---|---|
| 2,768,202 | 10/56 | Goldberg et al. | 260—294 |
| 2,836,599 | 5/58 | Frankel et al. | 260—294 |
| 2,854,379 | 9/58 | Fancher | 167—65 |
| 2,872,374 | 2/59 | Beiler et al. | 167—65 |
| 3,002,978 | 10/61 | Bocher | 260—326.3 |
| 3,006,913 | 10/61 | Mull | 260—239 |
| 3,037,991 | 6/62 | Szmuszkovicz | 260—239 |

IRVING MARCUS, *Primary Examiner.*

NICHOLAS S. RIZZO, WALTER A. MODANCE,
*Examiners.*